US012307917B2

(12) United States Patent
Aman et al.

(10) Patent No.: US 12,307,917 B2
(45) Date of Patent: May 20, 2025

(54) DENTAL SIMULATOR SYSTEM (71) Applicant: A-dec, Inc., Newberg, OR (US)

(72) Inventors: Kyle Aman, Keizer, OR (US); Thomas Mead, Newberg, OR (US); Samuel Porter, Newberg, OR (US)

(73) Assignee: A-DEC, INC., Newberg, OR (US)

( * ) Notice: Subject to any disclaimer, the term of this patent is extended or adjusted under 35 U.S.C. 154(b) by 1029 days.

(21) Appl. No.: 17/332,883

(22) Filed: May 27, 2021

(65) Prior Publication Data

US 2022/0383775 A1 Dec. 1, 2022

(51) Int. Cl.
*G09B 23/30* (2006.01)
*G09B 23/28* (2006.01)

(52) U.S. Cl.
CPC .................. *G09B 23/283* (2013.01)

(58) Field of Classification Search
CPC ...... G09B 23/28; G09B 23/283; G09B 23/30; G09B 19/0084
USPC .......................................................... 434/263
See application file for complete search history.

(56) References Cited

U.S. PATENT DOCUMENTS

| 451,061 | A | * | 4/1891 | Magnusson | G09B 23/283 |
| | | | | | 433/33 |
| 760,943 | A | * | 5/1904 | Wright | G09B 23/283 |
| | | | | | 434/264 |
| 1,166,796 | A | * | 1/1916 | Weisse | G09B 23/283 |
| | | | | | 434/264 |
| 1,194,017 | A | * | 8/1916 | Harper | G09B 23/283 |
| | | | | | 434/264 |
| 1,205,437 | A | * | 11/1916 | Delabarre | G09B 23/283 |
| | | | | | 434/264 |
| 1,215,087 | A | * | 2/1917 | Weisse | G09B 23/283 |
| | | | | | 434/264 |
| 1,682,904 | A | * | 9/1928 | Hanau | G09B 23/283 |
| | | | | | 434/264 |
| 3,520,060 | A | * | 7/1970 | Jameson | G09B 23/286 |
| | | | | | 434/264 |
| 4,035,920 | A | * | 7/1977 | Saupe | G09B 23/283 |
| | | | | | 434/263 |
| 5,158,488 | A | * | 10/1992 | Berlinghoff | G09B 23/283 |
| | | | | | 434/262 |

(Continued)

FOREIGN PATENT DOCUMENTS

| JP | 2004046102 | 2/2004 |
| JP | 2015075615 | 4/2015 |

(Continued)

OTHER PUBLICATIONS

"A-dec 42L Stationary Simulator Installation Guide," A-dec Headquarters, 2013, 24 pages. File dated: Mar. 4, 2021.
Virtualexpo Group, "Planmeca Compact™ i Sim," Medical Expo, Retrieved on Jun. 2, 2021, Retrieved from the Internet: <https://pdf.medicalexpo.com/pdf/planmeca/planmeca-compact-i-sim/73644-237590.html> 34 pages. Original Publication Date: Unknown.

(Continued)

*Primary Examiner* — Kurt Fernstrom
(74) *Attorney, Agent, or Firm* — Hanley, Flight & Zimmerman, LLC (57) ABSTRACT

An apparatus to support dental simulation, the apparatus including a torso to support a dental simulation manikin, an arm rotatably coupled to the torso, the torso rotatable along a first axis with respect to the arm, and a connector base to rotatably couple the arm to a hub portion, the connector base rotatable along a second axis, the second axis different than the first axis.

22 Claims, 6 Drawing Sheets

(56) References Cited

U.S. PATENT DOCUMENTS

| | | | | |
|---|---|---|---|---|
| 5,480,307 | A * | 1/1996 | Lang | G09B 23/283 434/262 |
| D392,878 | S * | 3/1998 | Nordstrom | D24/177 |
| 5,791,475 | A * | 8/1998 | Pichardo | G09B 23/283 446/73 |
| 7,544,061 | B2 * | 6/2009 | Poitras | G09B 23/32 434/263 |
| 9,218,751 | B2 * | 12/2015 | Montalbano | G09B 23/30 |
| 10,319,258 | B2 * | 6/2019 | McClure | G09B 23/283 |
| 10,596,699 | B2 * | 3/2020 | Simionescu | G09B 23/283 |
| 2012/0129140 | A1 * | 5/2012 | Wren | G09B 23/283 434/263 |
| 2012/0219936 | A1 * | 8/2012 | Furuki | G09B 23/283 434/264 |
| 2014/0106326 | A1 * | 4/2014 | Hemmer | G09B 23/283 434/264 |
| 2014/0356835 | A1 | 12/2014 | Montalbano et al. | |
| 2020/0016774 | A1 | 1/2020 | Keen et al. | |

FOREIGN PATENT DOCUMENTS

| | | |
|---|---|---|
| KR | 100748269 | 8/2007 |
| KR | 101080919 | 11/2011 |

OTHER PUBLICATIONS

Dentsply Sirona, "Sim Intego—Your individual workstations: Configuration Examples," The Dental Solutions Company, Retrieved on Jun. 2, 2021, Retrieved from the Internet: <https://assets.dentsplysirona.com/websites/clinic-solutions/pdf/en/SIM-Intego-2018-web.pdf> 9 pages. Filed dated: Mar. 23, 2018.

Dentsply Sirona, "Sim Multi Bench: Training in dentistry and dental technology in a compact space," The Dental Solutions Company, Retrieved on Jun. 2, 2021, Retrieved from the Internet: <https://assets.dentsplysirona.com/websites/clinic-solutions/pdf/en/Flyer_Sim_Units_GB_Ansicht.pdf> 3 pages. File dated: Apr. 25, 2017.

* cited by examiner

DENTAL SIMULATOR SYSTEM

FIELD OF THE DISCLOSURE

The present disclosure relates generally to dental training equipment and, more particularly, to a dental simulator system.

BACKGROUND

Dental simulators enhance the training of dental students to provide a realistic setting for practicing, for example, preclinical procedures prior to working with real patients in a clinical setting. For example, students can explore a variety of dental procedures on manikin devices to develop the necessary skills needed for dental practice. Dental simulators can provide future dental practitioners with the opportunity to develop manual dexterity by including features that replicate the spatial dynamics of a clinical setting. Additionally, dental simulators may integrate multiple clinical devices (e.g., electric motors, ultrasonic instruments, etc.) that a student may need to practice utilizing to develop competency as well as establish correct positioning and posture.

Wherever possible, the same reference numbers will be used throughout the drawing(s) and accompanying written description to refer to the same or like parts. As used in this disclosure, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DESCRIPTION

Dental training equipment with simulation capabilities improves dental education by allowing students to develop manual dexterity and improve problem solving skills using dental equipment prior to the treatment of real patients. For example, a dental simulator system can include a manikin with an oral cavity that can be used for training purposes. In addition to practicing dental procedures, students can learn to handle dental hand pieces and/or activate necessary devices (e.g., electric motors, ultrasonic instruments, intraoral cameras, etc.) as part of the training process when using a dental simulator system. To optimize the student experience, the dental simulator system can be integrated into an existing bench workstation area to provide accessibility to power outlets, gas nozzle(s), task lighting, air nozzle(s), monitor mount(s), and/or any other type of accessories (e.g., keyboard tray, dental operating light, storage area, etc.). In some examples, the simulator system can be (1) a bench-mounted simulator to provide a dedicated space for training, (2) a mobile simulator to provide additional positioning versatility, and/or (3) a freestanding simulator (e.g., that remains stationary).

Additionally, a dental simulator system as described herein can incorporate a dental delivery system (e.g., control unit supplying air and/or power to dental device(s)) for use during preclinical and/or procedural training. For example, the delivery system can include a "traditional" delivery system (i.e., in which dental instrument conduit(s) hang from a bottom portion of the control unit) or a "continental" delivery system (i.e., using a conduit guide system known as a "whip" that supports dental instrument conduit(s) from a top of the delivery system). For example, the dental instrument conduit(s) can include handheld instruments with cables and/or tubing (e.g., rotary handpieces, air/water syringes, ultrasonic scalers, intraoral cameras, etc.). In some examples, the continental delivery system provides enhanced ergonomics for the user. Likewise, the dental simulator system may accommodate various dental team positions and/or approaches (e.g., left-handed or right-handed operator work to allow for adequate maneuverability for both the operator and the assistant). For example, a clinician can move around a patient to access a specific area in the oral cavity (e.g., focusing on a 180 degree range around the top of the patient's head). In some examples, a right-handed clinician may access the oral cavity 90 degrees to the right of the top-most region of the patient's head (e.g., a crown of the patient's head), while a left-handed clinician may access the oral cavity 90 degrees to the left of the top-most region of the patient's head (e.g., the crown), thereby covering the full 180 degrees depending on the clinician's preference for positioning (e.g., left-handed versus right-handed positioning) without crossing into the workspace dedicated to adjoining workstations (e.g., an adjacent workspace). The workstation in combination with the dental simulator can serve as a simulation bench including a work surface. Furthermore, a bench-mounted dental simulator system as described herein may be stored in a manner that permits the multipurpose use of a workstation when the simulator system is not in use. For example, proper storage of a dental simulator system can ensure that an aisleway remains clear and does not introduce obstructions to individuals using the workstation (e.g., when the manikin is not in use).

An example bench-mounted continental simulator system disclosed herein improves upon known dental simulator units to provide an integrated unit that offers continental simulation (e.g., continental delivery), a multipurpose worksurface, a fully pivoting and adjustable torso, as well as an idle storage location. More specifically, the dental simulation system disclosed herein allows a user to approach the oral cavity in the 180 degree region surrounding the topmost region of a manikin head (e.g., the crown) without crossing into a workspace dedicated to adjoining workstations and/or aisleways (e.g., 90 degrees to the right of the crown and/or 90 degrees to the left of the crown). Additionally, the dental simulation system disclosed herein may be stored under the workstation (e.g., positioned partially, substantially, or completely under a counter, desktop, or other work surface). In the examples disclosed herein, the torso can pivot from a stored (0°) position (e.g., torso positioned vertically) to a use (90°) position (e.g., torso positioned horizontally). For example, a pressure line connected to the dental simulator can be used to disable and/or enable a brake mechanism permitting the pivoting of the torso. While the use position is in an approximately horizontal position, the use position can be less than or greater than 90°. In the examples disclosed herein, the torso can pivot from the stored position to the use position when positioning buttons are depressed (e.g., based on the use of gas-spring technology, etc.). In the examples disclosed herein, the torso can pivot based on the use of positive positioning (e.g., used to control the force required to pivot an arm around a pivot joint, such as a dental unit pivot arm used to support a control head to allow for selective pivoting and/or resistance to pivoting). An example positive positioning apparatus that may be utilized is described in connection with U.S. Patent Application Publication No. 2020/0016774, which is incorporated herein by reference in its entirety. In the examples disclosed herein, a control head of the dental simulator can be positioned directly over the torso or to the side of the torso, representing different simulated clinical uses.

The dental simulation system disclosed herein allows users to maintain continuity between simulation-based training and clinical work. The range of motion provided by the bench-mounted torso closely simulates clinical patient conditions, while the unit itself can be fully ambidextrous for various features (e.g., torso positioning, operator instrumentation, assistant instrumentation, and/or tray holder positioning). For example, the torso of the dental simulator system disclosed herein can simulate a dental patient chair swivel, allowing adjustments for different simulated clinical uses. Additionally, the example dental simulation system is adjustable for left-handed usage or right-handed usage, including an ambidextrous tray holder and/or assistant's holder that can be switched from a left-hand operation mode to a right-hand operation mode without the need for additional tools.

While the example dental simulator system described herein includes numerous features and components, it should be understood that other configurations and/or sub-configurations are within the scope of this disclosure. For example, an implementation of the dental simulator system may include a traditional delivery system instead of a continental delivery system, the dental simulator system may be mounted to a wall instead of a bench, and/or any other fixed structure, etc.

Figure 1A:
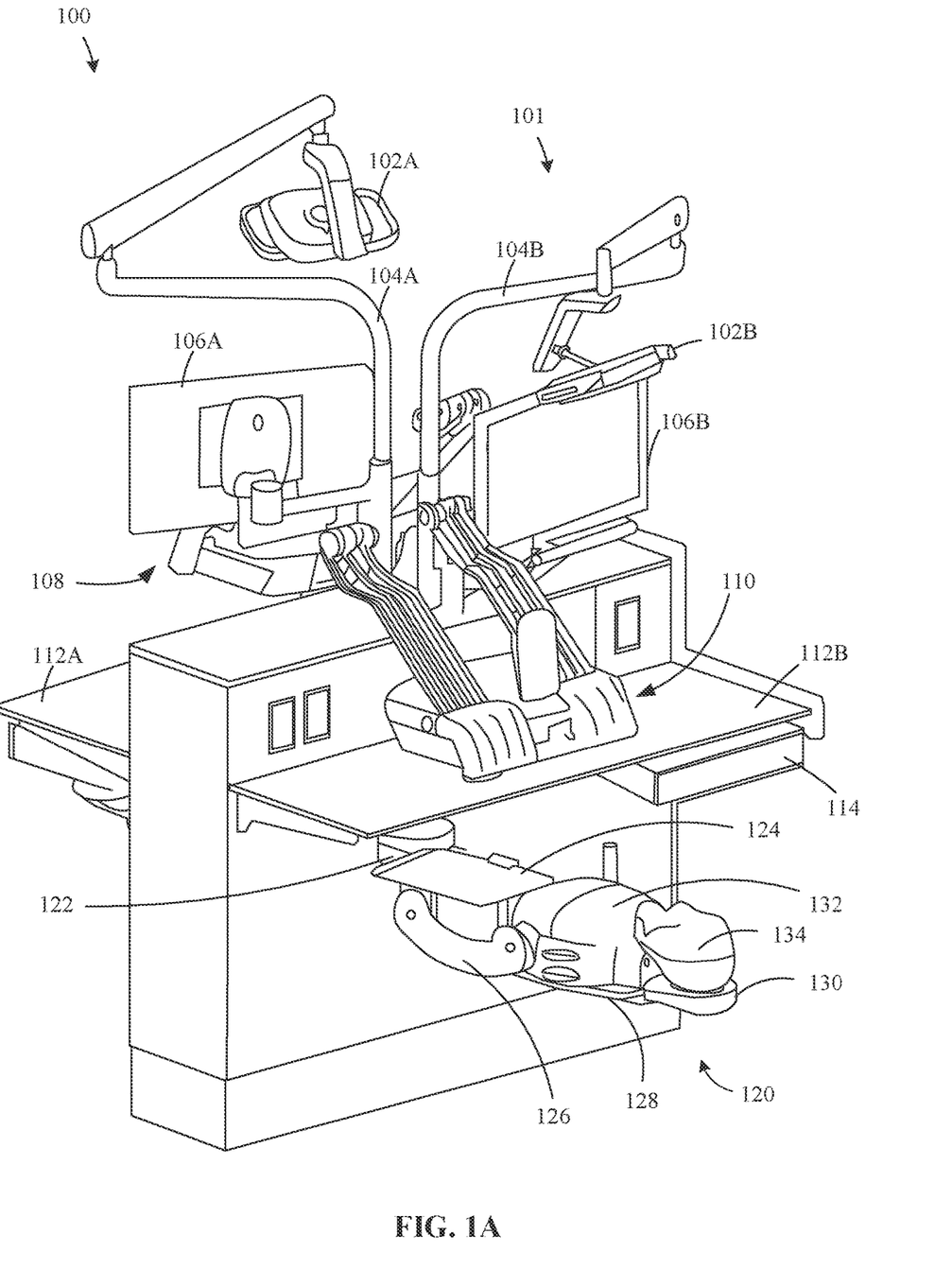
FIG. 1A is a perspective view of an example dental simulator system in which aspects of the present disclosure may be implemented.

FIG. 1A is a perspective view of an example bench-mounted dental simulator system 100 in which aspects of the present disclosure may be implemented. In the example of FIG. 1A, the bench-mounted dental simulator system 100 includes example dedicated workstation equipment 101 and an example dental simulator 120. The dedicated workstation equipment 101 includes example dental operating light(s) 102A, 102B (e.g., light-emitting diode (LED) lights), example light standard(s) 104A, 104B, example monitor(s) 106A, 106B, example delivery system(s) 108, 110, example workstation table(s) 112A, 112B, and an example dust collection drawer 114. The delivery system(s) 108, 110 can include a delivery system base, conduit carrier(s), and/or other accessories (e.g., whips, etc.). The dental simulator 120 includes an example hub 122, an example tray 124, an example extension arm 126, an example backrest 128, an example headrest 130, an example torso 132, and an example manikin head 134.

The dental operating light(s) 102A, 102B provide light for dental procedures and can be moved and/or repositioned by a user using numerous mounting and/or swing arm options (e.g., third-axis movement). The light standard(s) 104A, 104B support the dental operating light(s) 102A, 102B and can be used to reposition the operating light(s) 104A, 104B as needed. The monitor(s) 106A, 106B can similarly be repositioned and adjusted based on user preference (e.g., during a preclinical training procedure). The delivery system(s) 108, 110 can be any type of delivery system, including a traditional delivery system or a continental delivery system. In the example of FIG. 1A, the delivery system(s) 108, 110 provide access to handpieces positioned within adjustable handpiece holders. In the example of FIG. 1A, the delivery system(s) 108, 110 use a whip system that allows the handpiece(s) and/or syringe tubing(s) to be accessed from the top of the delivery system. In some examples, the delivery system(s) 108, 110 include a delivery system base that includes a handle to permit the user to reposition the delivery system(s) 108, 110 based on the desired location of the handpieces and/or accessibility to the handpieces.

The workstation table(s) 112A, 112B can be used as regular desks when the delivery system(s) 108, 110 and/or the dental simulator 120 are not in use. In the examples disclosed herein, the dental simulator 120 can be stored away completely under the workstation table(s) 112A, 112B when not in use, thereby allowing the workstation table(s) 112A, 112B to be used for any other type of training and/or activity that does not involve the use of the dental simulator 120. While the example dental simulator 120 may be stored away completely such that no portion of the dental simulator 120 extends outwardly from the edges of the workstation tabletop 112B (e.g., when in the orientation illustrated in FIG. 4), in other implementations, the dental simulator 120 may be stored in a position in which the dental simulator 120 extends partially beyond the edge(s) of the workstation tabletop 112B (e.g., the dental simulator 120 extends less than 1 inch beyond the edge(s), the dental simulator 120 extends less than 5 inches beyond the edge(s), etc). The example workstation table(s) 112A, 112B also supports the dust collection drawer 114, which can be opened or closed to activate the dust collection vacuum as needed during a dental pre-clinical training procedure.

The example dental simulator 120 replicates the spatial dynamics that can be helpful during pre-clinical training prior to a student's transition to clinical practice. For example, the dental simulator 120 allows a user to practice dental procedures over a movable manikin. At the same time, when the dental simulator 120 is integrated into the workstation table(s) 112A, 112B, the user can also access a complete delivery system including air-turbine and electric handpieces, ultrasonic instruments, curing lights, cameras, etc. In the example of FIG. 1A, the dental simulator 120 includes a hub 122 used to attach the dental simulator 120 below the workstation tabletop(s) 112A, 112B. As such, the hub 122 can serve as an attachment that is secured to a wall, a post, or other structure or surface. Additionally, the hub 122 provides support for horizontal movement of the extension arm 126 and, in combination, the torso 132, as described in more detail in connection with FIGS. 2-3. The extension arm 126 is rotatably coupled to the hub 122 and the torso 132, as described in connection with FIG. 2. The extension arm 126 provides versatility in the positioning of the torso 132 by supporting vertical movement of the torso 132 relative to the hub 122, as shown in the various torso 132 positioning example(s) 600, 700, and/or 800 of FIGS. 6-8. The backrest 128 provides a simulated dental chair backrest for the torso 132. In some examples, the torso 132 and/or the backrest 128 are supported by an internal frame structure. Additionally, the tray 124 can be attached to the dental simulator 120 via holder arms, as described in more detail in connection with FIG. 3. Additionally, the headrest 130 can be used to support a customized manikin head (e.g., head, skull, jaws, etc.) for use during dental procedure training. In the example of FIG. 1A, the manikin head 134 is positioned above the headrest 130. In some examples, the manikin head 134 can be supported by a rod connected to the torso 132.

Figure 1B:
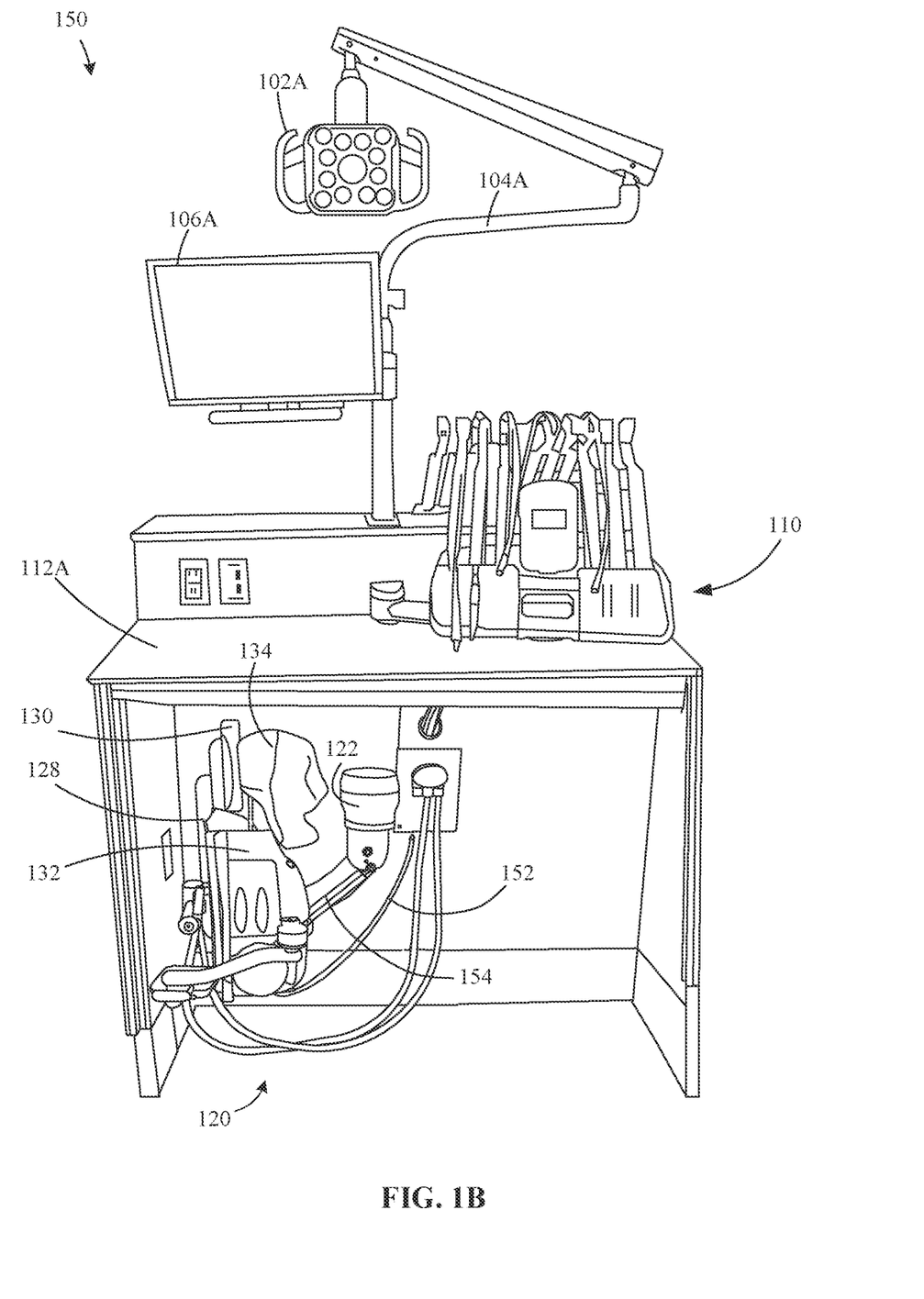
FIG. 1B is a perspective view of an example dental simulator system in a stored position under a dental workstation.

FIG. 1B is a perspective view 150 of the bench-mounted dental simulator system 120 in a stored position under a dental workstation. In the example of FIG. 1B, the dental simulator 120 is completely stored under the workstation table 112A such that the dental simulator 120 is positioned away from aisleway(s) and/or other workstation(s). As such, a given workstation can be used for other training purposes that can involve the workstation-based accessories (e.g., dental operating light 102A, light standard 104A, monitor 106A, etc.). Likewise, the workstation table 112A is free for use when the dental simulator 120 is stored away, as shown in the example of FIG. 1B. The ability to store the dental simulator 120 increases the overall usability of a given preclinical training area to allow for minimal space usage by the dental simulator 120 when it is not needed. In the example of FIG. 1B, the dental simulator 120 is shown positioned along a vertical axis, as described in more detail in connection with FIGS. 4-5. For example, the backrest 128, the headrest 130, and the torso 132 are shown positioned vertically in the example of FIG. 1B when the dental simulator 120 is in the stored position, as compared to when the dental simulator 120 is in the use position, as shown in FIG. 1A. To move the dental simulator 120 from the use position of FIG. 1A to the stored position of FIG. 1B, and vice-versa, an example pressure line 152 is connected to the dental simulator 120 to disable and enable the brake mechanisms enabling the pivoting of the torso 132. In the example of FIG. 1B, the hub 122 additionally serves as a pivot with a friction clutch to provide resistance to pivoting of the torso 132 in a horizontal plane. In some examples, a friction brake linked to the hub 122 can be overcome to initiate movement of the torso 132.

In some examples, a gas spring internal to the torso 132 can be unlocked/disengaged to allow tilt of the dental simulator 120 and/or the gas spring 154 can be disengaged/unlocked to allow vertical movement of the dental simulator 120. In some examples, the torso 132 of the dental simulator includes button(s) that can be depressed to unlock the friction brake associated with the hub 122, as described in more detail in connection with FIG. 3. As such, the dental simulator 120 can pivot about an axis more freely. For example, such button(s) can receive an air supply, with the hub 122 receiving a signal that indicates that the friction brake should be unlocked when the button(s) are engaged by the user. In some examples, the extension arm 126 can also assist in the movement of the dental simulator 120 through an internal mechanism that includes a link bar (e.g., four bar linkage). For example, as the extension arm 126 is moved, the link bar can maintain articulation of the torso 132. In some examples, the articulation of the torso 132 can be independent of the angle of the extension arm 126 and/or the rotation of the extension arm 126.

Figure 2:
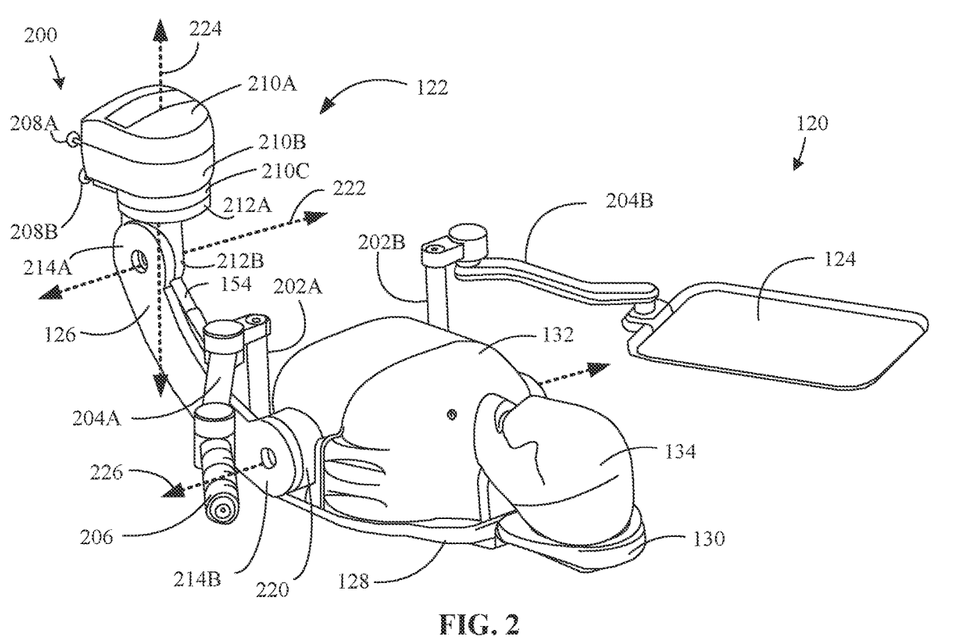
FIG. 2 is a left side perspective view of the dental simulator system of FIG. 1A, including auxiliary attachments used to support dental training.

FIG. 2 is a left side perspective view 200 of the dental simulator system 120 of FIG. 1A, including auxiliary attachments used to support dental training. In the example of FIG. 2, the hub 122 includes example right side bolts 208A, 208B to secure the dental simulator 120 to the workstation (e.g., below the workstation table(s) 112A, 112B). While two example bolts are shown on the right side of the dental simulator 120, any other number of bolts can be used. Alternatively, the dental simulator 120 can be secured in any other method/components, including using any other type of attachment and/or attachment of the dental simulator 120 to any other surface (e.g., the floor, etc.). For example, the dental simulator 120 may be attached to a bracket secured to the workstation or other surface, bolts or screws that extend from the workstation or other surface, etc.

In the example of FIG. 2, the hub includes an example first portion 210A, an example second portion 210B, and an example third portion 210C. The first portion 210A, the second portion 210B, and the third portion 210C are directly connected without any movable parts. The second portion 210B includes the bolts 208A and 208B used to secure the dental simulator 120 below the workstation table(s) 112A, 112B, while the first portion 210A can include a hollow region on the side facing the workstation table(s) 112A, 112B. While the first portion 210A and the second portion 210B share a similar profile, the third portion 210C has a reduced surface area that creates a circular base below the second portion 210B. In addition to the first portion 210A, the second portion 210B, and the third portion 210C, the hub 122 includes a first connector base 212A and a second connector base 212B. The first connector base 212A is rotatably coupled to the third portion 210C. The second connector base 212B is directly connected to the first connector base 212A, such that the first connector base 212A and the second connector base 212B form a single structure rotatably coupled to the third portion 210C. In the example of FIG. 2, the first connector base 212A rotates left-to-right or right-to-left, such that the movement of the first connector base 212A is restricted to rotation in a generally horizontal plane about the third portion 210C.

The extension arm 126 includes an example first end 214A and an example second end 214B. The first end 214A is rotatably coupled to the second connector base 212B, while the second end 214B is rotatably coupled to the torso 132. In the example of FIG. 2, the first end 214A rotates about an example first axis 222 relative to the second connector base 212B. However, the ability of the second connector base 212B to rotate about an example second axis 224 about the third portion 210C (e.g., via the first connector base 212A), allows the extension arm 126 the freedom of movement about both the first axis 222 and the second axis 224 via the first end 214A. The second end 214B is restricted to rotation about an example third axis 226. In some examples, the connector base(s) 212A, 212B can include a friction clutch and/or a friction brake. In some examples, the connector base(s) 212A, 212B form a pivot to rotatably couple the extension arm 126 to the hub 122. For example, while the extension arm 126 (e.g., second end 214B) can be rotatably coupled to the torso 132 (e.g., the first torso connector 220 rotatable along the third axis 226), the connector base(s) 212A, 212B can be rotatable along the second axis 224. Likewise, the extension arm 126 (e.g., first end 214A) can be rotatable along the first axis 222, the first axis 222 parallel to the third axis 226. In some examples, the second axis 224 is perpendicular to the first axis 222 and/or the third axis 226. In some examples, the extension arm 126 is coupled to the gas spring 154 to allow for height adjustment of the simulator device body.

In the example of FIG. 2, the backrest 128 provides a simulated backrest. Additionally, the backrest 128 connects to the headrest 130 (e.g., used for the customized manikin head 134). The torso 132 can be used to replicate the spatial features of a human torso. This allows the user (e.g., a dental student in preclinical training) to experience the actual dimensions of a potential patient and learn how to perform dental procedures that account for the location of the patient's torso, thereby better preparing the user for interactions with a real patient. Additional features of the torso 132, including control of torso positioning, are discussed in connection with FIG. 3. An example first holder arm 202A and an example second holder arm 202B can be connected to the torso 132 (e.g., the holder arm 202A connects to the first torso connector 220). The first and second holder arm(s) 202A, 202B can be used for inserting an example instrumentation holder arm 204A (e.g., an instrument holder attachment) or an example tray holder arm 204B (e.g., a tray attachment). In the example of FIG. 2, the instrumentation holder arm 204A is positioned within the first holder arm 202A, while the tray holder arm 204B is positioned within the second holder arm 202B. The instrumentation holder arm 204A includes an example holder 206 (e.g., for handpieces), while the tray holder arm 204B includes the tray 124. The instrumentation holder arm 204A and the tray holder arm 204B can be switched between the first and second holder arm(s) 202A, 202B as needed to accommodate left-handed operation and/or right-handed operation (e.g., a left-handed mode or a right-handed mode). The instrumentation holder arm 204A and the tray holder arm 204B can be switched without the use of tools, reducing the amount of time to make necessary adjustments. In some examples, the instrumentation holder arm 204A is bench-mounted and/or torso-mounted.

Figure 3:
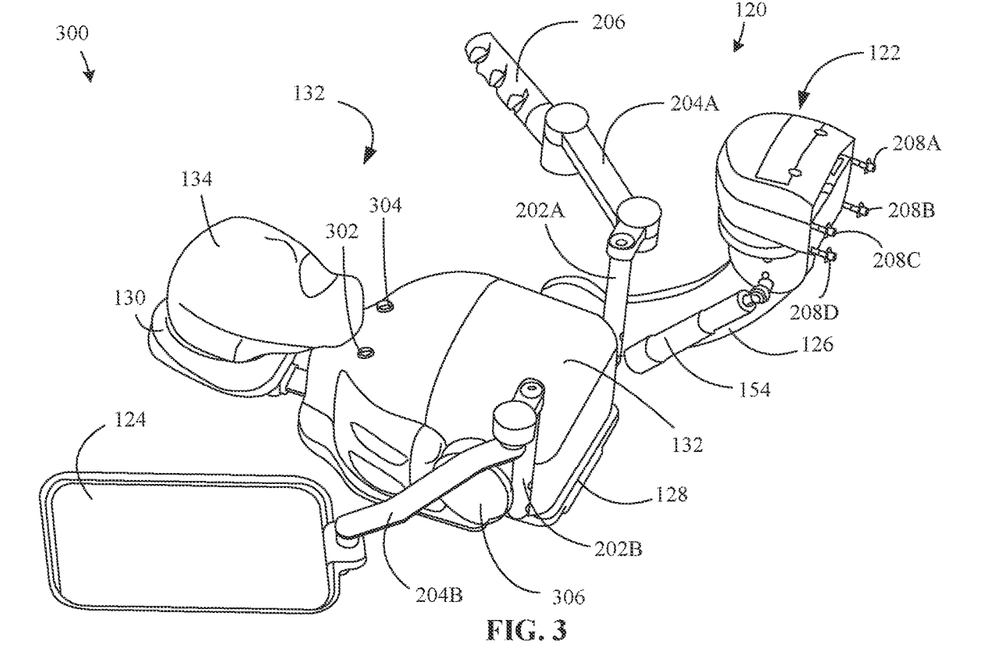
FIG. 3 is a right side perspective of the dental simulator system of FIG. 1A, including auxiliary attachments.
Figure 4:
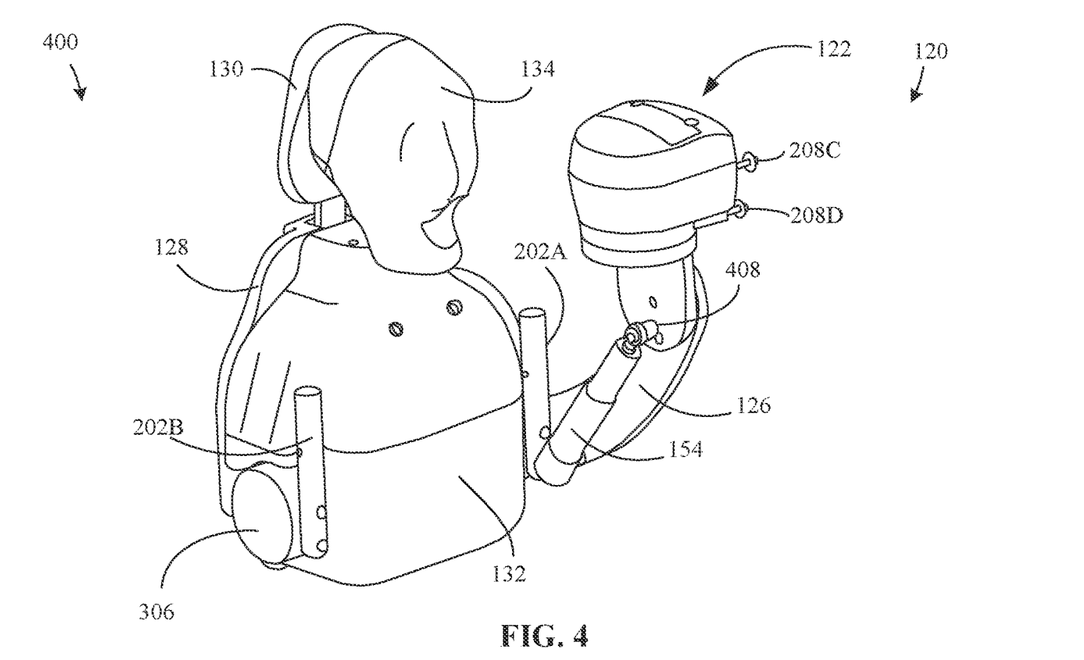
FIG. 4 is a perspective view of the dental simulator system of FIG. 1A including a torso of the simulator shown in a stored, vertical position.
Figure 5:
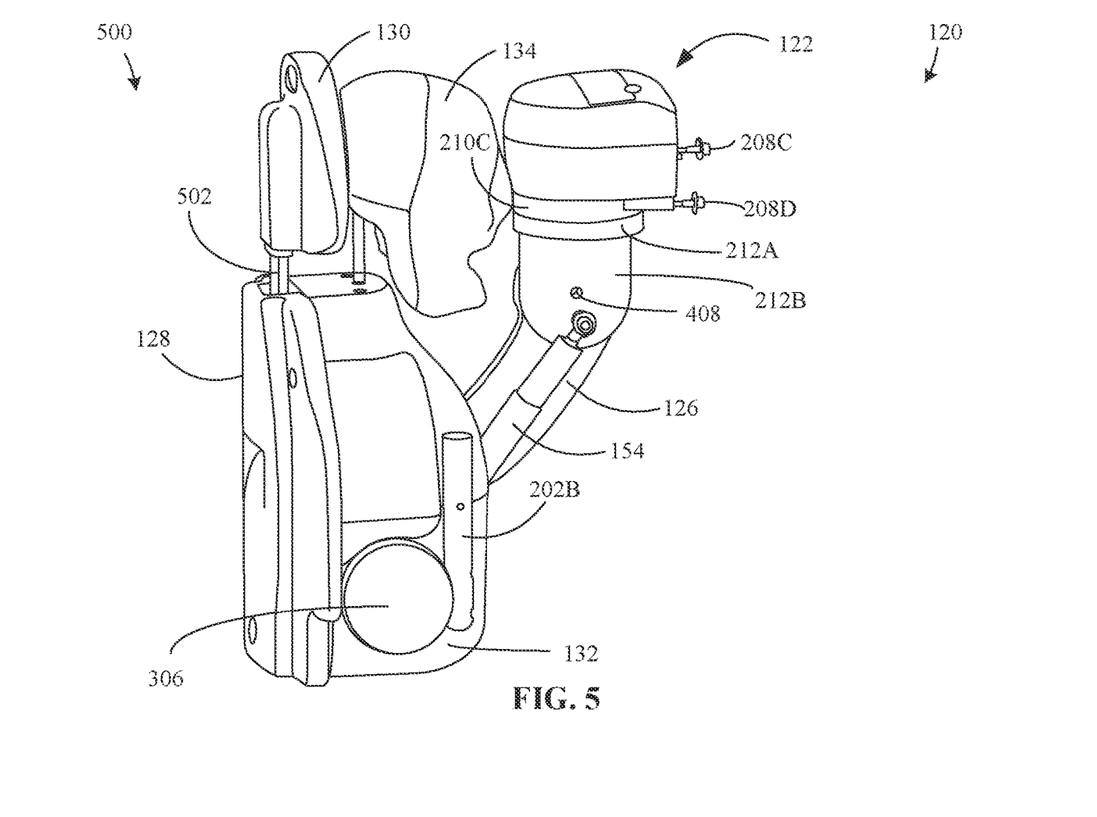
FIG. 5 is a perspective view of the dental simulator system of FIG. 1A including the torso of the simulator shown in a deployed, vertical position.
Figure 7:
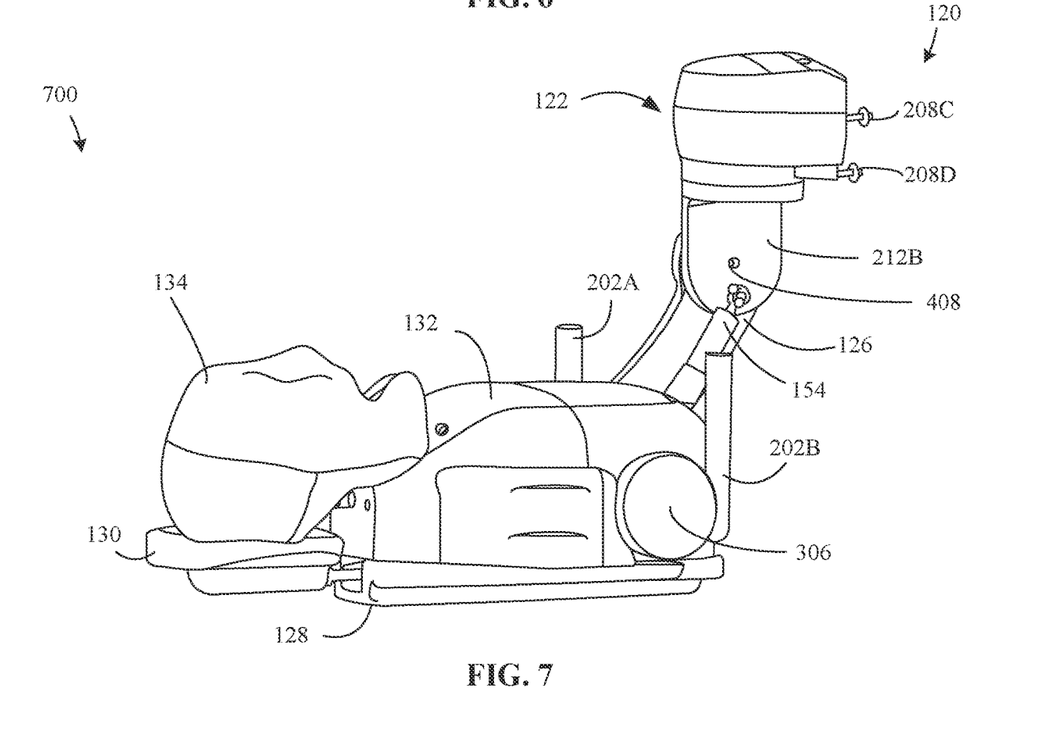
FIG. 7 is a perspective view of the dental simulator system of FIG. 1A including the torso of the simulator shown in a deployed, reclined position.
Figure 8:
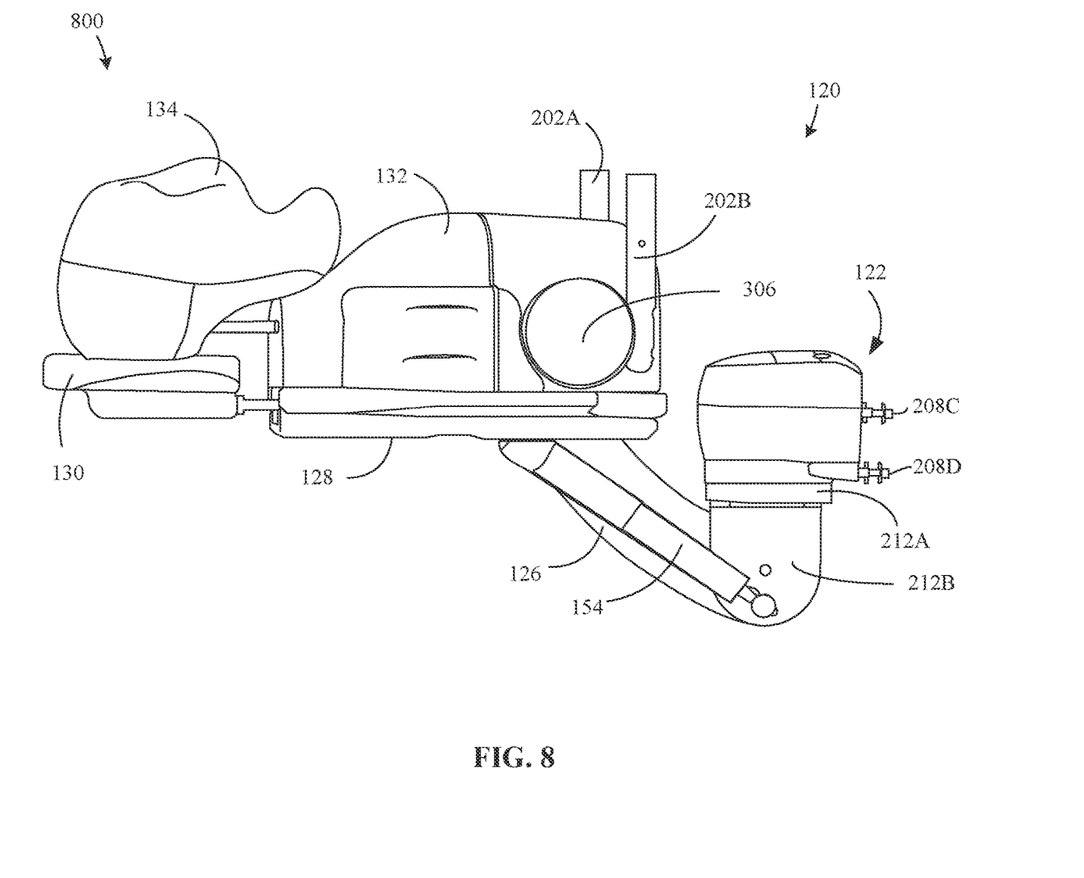
FIG. 8 is a perspective view of the dental simulator system of FIG. 1A including the torso of the simulator shown in a deployed, height-adjusted position.

FIG. 3 is a right side perspective 300 of the dental simulator system 120 of FIG. 1A, including auxiliary attachments (e.g., the instrumentation holder arm 204A, tray holder arm 204B). In the example of FIG. 3, the instrumentation arm 204A and the tray holder arm 204B, including the tray 124 and the holder 206, are shown positioned on either side of the torso 132. The first holder arm 202A and the second holder arm 202B are adjacent the backrest 128 and can be connected to the torso 132 (e.g., via the first torso connector 220 and/or an example second torso connector 306). In the example of FIG. 3, the second holder arm 202B is fixed to the second torso connector 306. For example, the tray holder arm 204B can include a linkage that facilitates rotation and positioning of the tray 124. The second torso connector 306 is positioned directly opposite of the first torso connector 220 of FIG. 2. As described in connection with FIG. 2, the extension arm 126 is rotatably coupled to the first torso connector 220 and the hub 122. In the example of FIG. 3, a total of four bolts, including the right-side bolts 208A, 208B, and example left-side bolts 208C, 208D support the hub (e.g., the second portion 210B of FIG. 2). However, any number of bolts and/or any other type of attachment method can be used to attach the dental simulator 120 to an area below the workstation table(s) 112A, 112B (e.g., as shown in the example of FIG. 1) and/or any other area of attachment for securing the dental simulator 120 (e.g., the floor). Furthermore, in the example of FIG. 3, the torso 132 includes example button(s) 302, 304. In some examples, the button(s) 302, 304 can include button cover(s). The button(s) 302, 304 can be used to release the brake mechanism, enabling repositioning of the torso 132. For example, the button(s) 302, 304 can be pressed and held to raise the torso 132 upwards and/or downwards. In some examples, once the button(s) 302, 304 are released, the torso 132 locks in position and is stabilized. As such, an activation of the positioning button(s) 302, 304 can be used to pivot the torso 132 from a storage position to a use position. For example, the storage position (e.g., as shown in FIGS. 4-5) is perpendicular to the use position (e.g., as shown in FIG. 7-8). Additionally, the positioning button(s) 302, 304 can be connected to a torso lift valve or a torso tilt valve. In some examples, the torso lift valve or the torso tilt valve can be used to unlock the brake mechanism to deploy the torso to the storage-position or the use-position. As such, a user of the torso does not need to reach under a worksurface to adjust a tensioning lever and/or any other type of mechanism needed to unlock the pivot. Methods and apparatus disclosed herein, thereby, improve the efficiency and operation of the torso pivot mechanism. In some examples, the pivot mechanism of the dental simulator system can simulate a dental patient chair swivel, which can be used to assist a dental practitioner with reaching parts of the oral cavity that would otherwise be more difficult to access during simulated dental treatment. In some examples, the pivot mechanism can cause the torso 132 to stop at a 90 degree angle during deployment to the use position of FIGS. 2-3. However, the rotation of the torso 132 can be reconfigured to allow for the torso 132 to deploy to a use position that is greater or less than the 90 degree position shown in the examples of FIGS. 2-3, thereby allowing the movement of the torso 132 to simulate the dental patient chair swivel movement. In particular, the dental patient chair swivel movement of the torso 132 simulates the clinical constraint of a dental chair swivel about a fixed point. For example, while a dental chair swivel motion allows a practitioner to access more areas of the oral cavity while preserving good ergonomic posture, the dental chair swivel can be constrained to a specific axis. As such, a practitioner in training (e.g., a dental student) can learn to leverage the existing dental chair swivel motion constraints using the dental simulator system 120 disclosed herein (e.g., using the dental patient chair swivel movement of the torso 132). For example, a dental chair used by the patient during a dental procedure can place the oral cavity 76-86 centimeters (e.g., 30-34 inches) from the chair swivel axis. The dental simulator system 120 disclosed herein simulates the movement of the dental chair (e.g., by positioning the oral cavity 50-66 centimeters (20-26 inches) from the swivel point, etc.). In some examples, the dental simulator system 120 can include miniaturized components to accommodate reduced floor space for training purposes (e.g., the torso 132 of the dental simulator system 120 can be smaller than an average human torso, the backrest 128 can be smaller than a dental chair backrest, etc.).

FIG. 4 is a perspective view 400 of the dental simulator system 120 of FIG. 1A including a torso 132 of the simulator shown in a stored, vertical position. In the example of FIG. 4, the holder arm 202A and the second holder arm 202B are shown without the tray 124 and the holder 206 attachments of FIGS. 2-3. In the example of FIG. 4, the torso 132, including the backrest 128 and the headrest 130, is positioned vertically. As shown in FIG. 4, the hub 122 (e.g., attached to an area below the workstation table(s) 112A, 112B via left-side bolts 208C, 208D) can be approximately level with the headrest 130 when the torso 132 is upright and in the stored position. As such, use of the bench-mounted torso provides convenient storage and a reduced footprint of the simulation station (e.g., stores out of the way of aisles and/or multipurpose knee space, etc.). the torso of the dental simulation system can be stored upright (e.g., along a longitudinal axis) for fluid retention and easily deploys to a use position (e.g., defined by a 90° angle), in contrast to other known approaches. The torso 132 can be raised higher or lower (e.g., using button(s) 302, 304 of FIG. 3), depending on the desired storage position. Additionally, the torso 132 can be pivotally coupled to the second end 214B of the extension arm, wherein the torso 132 stores upright along the second axis 224 of FIG. 2, such that an upper end of the torso 132 is oriented towards a surface of the attachment (e.g., the first portion 210A and/or the second portion 210B). In some examples, a height of the torso 132 or a tilt of the torso 132 is adjustable using air valves disposed, for example, within the torso 132.

FIG. 5 is a perspective view 500 of the dental simulator system 120 of FIG. 1A including the torso 132 of the simulator shown in a deployed, vertical position. To achieve the positioning of the torso 132 of FIG. 5 from the original position shown in FIG. 4, the torso 132 (e.g., including the backrest 128 and the headrest 130) can be rotated from left to right along the rotatably coupled intersection of the third portion 210C, the first connector base 212A, and/or about the second axis 224 of FIG. 2. For example, the hub 122 stabilizes the dental simulator 120 via the bolt(s) 208C, 208D (and/or the bolts 208A, 208B). In some examples, the dental simulator 120 can be rotated to the position shown in FIG. 5 by holding either side of the torso 132. As the torso 132 is turned from left to right (e.g., such that the headrest 130 faces a front of the hub 122), the first connector base 212A rotates in a horizontal plane with respect to the hub 122. Since the first connector base 212A and the second connector base 212B form a single interconnected structure and the extension arm 126 is directly connected to the second connector base 212B (e.g., via the attachment 408), the connector bases(s) 212A, 212B, the extension arm 126, and the torso 132 move in unison. In some examples, the headrest 130 can be attached to the torso 132 (e.g., via example bar 502) before the torso 132 is ready for preclinical training use. Likewise, the manikin head 134 can be attached to the torso 132 via a neck rod prior to the placement of the torso 132 in the desired position (e.g., deployed position) and/or just prior to the start of a preclinical training session.

Figure 6:
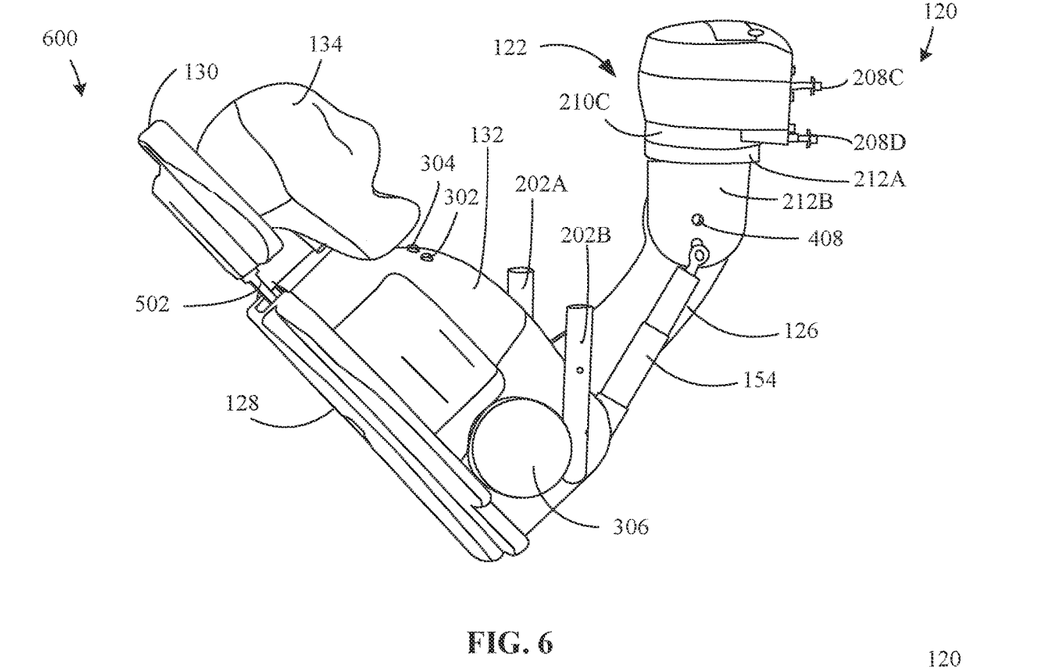
FIG. 6 is a perspective view of the dental simulator system of FIG. 1A including the torso of the simulator shown in a deployed, intermediate position.

FIG. 6 is a perspective view 600 of the dental simulator system 120 of FIG. 1A including the torso 132 of the simulator shown in a deployed, intermediate position. To achieve the positioning of the torso 132 in the perspective view 600 of FIG. 6 starting from the positioning of the torso 132 in the perspective view 500 of FIG. 5, the torso 132 (e.g., including the backrest 128, the headrest 130, etc.) can be reclined such that the first torso connector 220 rotates along the third axis 226 of FIG. 2 with respect to the second end 214B of FIG. 2 of the extension arm 126 (e.g., the torso 132 rotatable along the third axis 226 with respect to the arm 126). In some examples, the torso 132 also rotates at the same angle with respect to the second torso connector 306, such that the first and second holder arm(s) 202A, 202B remain positioned vertically as in FIG. 5. In some examples, the buttons(s) 302, 304 located on the torso 132 can be pressed to enable further adjustment of the torso 132 (e.g., upwards and/or downwards). In some examples, the button(s) 302, 304 include a pneumatic actuator button to release the gas spring 154, allowing for rotation of the arm 126 and/or adjustment of the torso 132 height. In some examples, the torso 132 can maintain a desired angle as long as one of the button(s) 302, 304 is not engaged. During the rotation of the torso 132 as described above, the hub 122 (e.g., third portion 210C, first connector base 212A, second connector base 212B) and/or the extension arm 126 (e.g., connected to the second connector base 212B via attachment 408) can remain in the same position as shown in the perspective view 500 of FIG. 5. In some examples, the extension arm 126 can be simultaneously adjusted by rotating in a vertical plane with respect to the second connector base 212B via attachment 408).

FIG. 7 is a perspective view 700 of the dental simulator system 120 of FIG. 1A including the torso 132 of the simulator shown in a deployed, reclined position. As previously described, the hub 122 secures the dental simulator system 120 to, for example, an area below the workstation table(s) 112A, 112B (e.g., via the bolt(s) 208C, 208D). In the example of FIG. 7, the torso 132 (e.g., including the backrest 128, the headrest 130, etc.) is lowered into a horizontal position from the original angled position shown in the perspective view 600 of FIG. 6. For example, the torso 132 rotates in a vertical plane relative to the first and second torso connector(s) 220, 306. In some examples, the button(s) 302, 304 located on the torso 132 can pressed to enable repositioning of the torso 132. As shown in the example of FIG. 7, the first and second holder arm(s) 202A, 202B remain positioned vertically to allow for the instrumentation arm 204A and/or the tray holder arm 204B to be inserted into the first and/or second holder arm(s) 202A, 202B. In some examples, the extension arm 126 can be adjusted to allow for vertical movement of the torso 132. For example, the extension arm 126 can rotate in a vertical plane relative to the second connector base 212B due to the rotatable coupling of the first end 214A of the extension arm 126 to the second connector base 212B (e.g., via attachment 408), and/or the extension arm 126 can rotate in a horizontal plane relative to the hub 122 due to the rotatable coupling of the extension arm 126 to the second connector base 212B which forms a single structure with the first connector base 212A.

FIG. 8 is a perspective view 800 of the dental simulator system 120 of FIG. 1A including the torso 132 of the simulator shown in a deployed, height-adjusted position. In the example of FIG. 8, the torso 132 is raised vertically from the original perspective view 700 of FIG. 7 to the positioning shown in the perspective view 800 of FIG. 8. For example, while the torso 132 remains in the same horizontal position as shown in the perspective view 700 of FIG. 7, the extension arm 126 rotates in a vertical plane with respect to the second connector base 212B and the first torso connector 220. For example, the first end 214A rotates in a vertical plane relative to the second connector base 212B and/or the second end 214B rotates in a vertical plane relative to the first torso connector 220. In some examples, the first connector base 212A, the second connector base 212B, the extension arm 126, and/or the torso 132 rotate in a horizontal plane relative to the third portion 210C. In some examples, the headrest 130 can be adjusted to support the manikin head 134 once the dental simulator 120 is in the height-adjusted position (e.g., ready for preclinical training). In some examples, the instrumentation holder arm 204A and/or the tray holder arm 204B are inserted into the first and/or second arm holder(s) 202A, 202B. During the preclinical training, the user can likewise adjust the positioning of the torso 132 to accommodate the user's sitting height and/or positioning relative to the torso 132.

An example dental simulator system is disclosed herein. Further examples and combinations thereof include the following:

Example 1 includes an apparatus to support dental simulation, the apparatus comprising a torso to support a dental simulation manikin, an arm rotatably coupled to the torso, the torso rotatable along a first axis with respect to the arm, and a connector base to rotatably couple the arm to a hub portion, the connector base rotatable along a second axis, the second axis different than the first axis.

Example 2 includes the apparatus of example 1, wherein the connector base includes a friction clutch.

Example 3 includes the apparatus of example 1, wherein the arm is rotatable along a third axis, the third axis parallel to the first axis.

Example 4 includes the apparatus of example 1, wherein the second axis is perpendicular to the first axis, the first axis positioned along a first plane and the second axis positioned along a second plane, the second plane different than the first plane.

Example 5 includes the apparatus of example 1, wherein the torso, the arm, and the connector base are positioned underneath a workstation table during storage.

Example 6 includes the apparatus of example 1, wherein the torso includes a first holder arm and a second holder arm, the first holder arm and the second holder arm to interchangeably support a tray attachment or an instrument holder attachment.

Example 7 includes the apparatus of example 6, wherein an interchange between the tray attachment and the holder attachment is performed without usage of tools.

Example 8 includes the apparatus of example 1, wherein the hub portion is mounted to a fixed structure.

Example 9 includes an apparatus for dental training, the apparatus comprising an extension arm, the extension arm including a first end and a second end, the first end movably coupled to an attachment, the attachment secured to a fixed surface, and a torso pivotally coupled to the second end of the extension arm, wherein the torso stores upright along a longitudinal axis, an upper end of the torso oriented towards a surface of the attachment.

Example 10 includes the apparatus of example 9, wherein the torso simulates a chair swivel.

Example 11 includes the apparatus of example 9, wherein the torso includes a positioning button, an activation of the positioning button to allow deployment of the torso from a storage position to a use position by releasing a brake mechanism.

Example 12 includes the apparatus of example 11, wherein the positioning button is connected to a torso lift valve or a torso tilt valve, the torso lift valve or the torso tilt valve to unlock the brake mechanism to deploy the torso to the storage position or the use position.

Example 13 includes the apparatus of example 11, wherein the storage position is perpendicular to the use position, the torso positioned underneath a workstation in the storage position, the storage position to remove the torso from a multipurpose knee space.

Example 14 includes the apparatus of example 12, wherein the use position allows a user access to a 180 degree range around a top of a manikin head including an oral cavity, the 180 degree range accessible to the user without overlap with an adjacent workspace.

Example 15 includes the apparatus of example 9, wherein the fixed surface is a portion of a workstation.

Example 16 includes the apparatus of example 9, wherein locking of torso motion is remotely actuated during repositioning, the locking of torso motion including a height adjustment, a tilt adjustment, or a pivot adjustment.

Example 17 includes a system comprising a simulation bench including a work surface, and a torso pivotally coupled to an arm, the arm to provide support for a simulator device body to allow movement of the simulator device body in multiple directions to simulate a dental procedure, the simulator device body to store in an upright position underneath the work surface, and the simulator device body coupled to the simulation bench by the arm.

Example 18 includes the system of example 17, wherein the arm and torso support system allow for a tilt or a height adjustment of the simulator device body.

Example 19 includes the system of example 17, wherein the torso simulates a chair swivel to accommodate usage.

Example 20 includes the system of example 17, further including an instrumentation holder arm or a tray holder arm, the instrumentation holder arm configurable for a right-handed user or a left-handed user.

Example 21 includes the system of example 20, wherein the instrumentation holder arm or the tray holder arm is bench-mounted or torso-mounted.

Example 22 includes the system of example 17, wherein the arm is coupled to a gas spring system to allow for height adjustment of the simulator device body.

Example 23 includes the system of example 17, wherein the simulator device body includes air valves to actuate repositioning of the torso during movement from a storage position to a use position.

From the foregoing, it will be appreciated that example dental simulator disclosed herein facilitates improved use and efficient utilization of space in a room (e.g., a training room). The disclosed dental simulator may be stored partially or completely under a work surface to avoid encroaching on available work areas. Such simulator may be stored in an upright position (e.g., to ensure retention of any remaining fluid), stored near a use position, stored out of the way of knee space under a work surface, etc. In some implementations, the dental simulator provides ambidextrous use allowing torso position, doctor's instrumentation, assistant's instrumentation, and tray holders to be alternated between a right-handed use and a left-handed use. In some implementations of the dental simulator, a release mechanism may be utilized to remotely actuate mechanisms to release brake(s) to allow movement, rotation, and/or storage of the dental simulator.

Although certain example methods, apparatus and articles of manufacture have been described herein, the scope of coverage of this disclosure is not limited thereto. On the contrary, this disclosure covers all methods, apparatus and articles of manufacture fairly falling within the scope of the claims.

The invention claimed is:

1. An apparatus to support dental simulation, the apparatus comprising:
 a torso to support a dental simulation manikin;
 an arm rotatably coupled to the torso, the torso rotatable along a first axis with respect to the arm; and
 a connector base to rotatably couple the arm to a hub portion, the connector base rotatable along a second axis, the second axis different than the first axis, wherein the arm is rotatable along a third axis, the third axis parallel to the first axis.

2. The apparatus of claim 1, wherein the connector base includes a friction clutch.

3. The apparatus of claim 1, wherein the second axis is perpendicular to the first axis, the first axis positioned along a first plane and the second axis positioned along a second plane, the second plane different than the first plane.

4. The apparatus of claim 1, wherein the torso, the arm, and the connector base are positioned underneath a workstation table during storage.

5. The apparatus of claim 1, wherein the torso includes a first holder arm and a second holder arm, the first holder arm and the second holder arm to interchangeably support a tray attachment or an instrument holder attachment.

6. The apparatus of claim 5, wherein an interchange between the tray attachment and the holder attachment is performed without usage of tools.

7. The apparatus of claim 1, wherein the hub portion is mounted to a fixed structure.

8. An apparatus for dental training, the apparatus comprising:
   an extension arm, the extension arm including a first end and a second end, the first end movably coupled to an attachment, the attachment secured to a fixed surface; and
   a torso pivotally coupled to the second end of the extension arm, wherein the torso stores upright along a longitudinal axis, an upper end of the torso oriented towards a surface of the attachment.

9. The apparatus of claim 8, wherein the torso simulates a chair swivel.

10. The apparatus of claim 8, wherein the torso includes a positioning button, an activation of the positioning button to allow deployment of the torso from a storage position to a use position by releasing a brake mechanism.

11. The apparatus of claim 10, wherein the positioning button is connected to a torso lift valve or a torso tilt valve, the torso lift valve or the torso tilt valve to unlock the brake mechanism to deploy the torso to the storage position or the use position.

12. The apparatus of claim 10, wherein the storage position is perpendicular to the use position, the torso positioned underneath a workstation in the storage position, the storage position to remove the torso from a multipurpose knee space.

13. The apparatus of claim 11, wherein the use position allows a user access to a 180 degree range around a top of a manikin head including an oral cavity, the 180 degree range accessible to the user without overlap with an adjacent workspace.

14. The apparatus of claim 8, wherein the fixed surface is a portion of a workstation.

15. The apparatus of claim 8, wherein locking of torso motion is remotely actuated during repositioning, the locking of torso motion including a height adjustment, a tilt adjustment, or a pivot adjustment.

16. A system comprising:
   a simulation bench including a work surface; and
   a torso pivotally coupled to an arm, the arm to provide support for a simulator device body to allow movement of the simulator device body in multiple directions to simulate a dental procedure, the simulator device body to store in an upright position underneath the work surface, and the simulator device body coupled to the simulation bench by the arm.

17. The system of claim 16, wherein the arm and torso support system allow for a tilt or a height adjustment of the simulator device body.

18. The system of claim 16, wherein the torso simulates a chair swivel to accommodate usage.

19. The system of claim 16, further including an instrumentation holder arm or a tray holder arm, the instrumentation holder arm configurable for a right-handed user or a left-handed user.

20. The system of claim 19, wherein the instrumentation holder arm or the tray holder arm is bench-mounted or torso-mounted.

21. The system of claim 16, wherein the arm is coupled to a gas spring system to allow for height adjustment of the simulator device body.

22. The system of claim 16, wherein the simulator device body includes air valves to actuate repositioning of the torso during movement from a storage position to a use position.

* * * * *